(12) United States Patent
Schmelter

(10) Patent No.: US 7,877,640 B2
(45) Date of Patent: Jan. 25, 2011

(54) METHOD AND SYSTEM FOR PROVIDING ENHANCED EXCEPTION MESSAGES FOR EXCEPTIONS THROWN BY VIRTUAL MACHINES

(75) Inventor: Ralf Schmelter, Wiesloch (DE)

(73) Assignee: SAP AG, Walldorf (DE)

( * ) Notice: Subject to any disclaimer, the term of this patent is extended or adjusted under 35 U.S.C. 154(b) by 448 days.

(21) Appl. No.: 11/731,505

(22) Filed: Mar. 30, 2007

(65) Prior Publication Data

US 2008/0244324 A1 Oct. 2, 2008

(51) Int. Cl.
*G06F 11/00* (2006.01)
(52) U.S. Cl. ............................. 714/38; 714/46; 714/57; 717/124
(58) Field of Classification Search ...................... None
See application file for complete search history.

(56) References Cited

U.S. PATENT DOCUMENTS

| | | | | |
|---|---|---|---|---|
| 5,555,419 A | * | 9/1996 | Arsenault | 717/136 |
| 5,673,390 A | * | 9/1997 | Mueller | 714/57 |
| 6,090,154 A | * | 7/2000 | Jeffries et al. | 717/125 |
| 6,138,253 A | * | 10/2000 | Buzsaki | 714/48 |
| 6,565,608 B1 | * | 5/2003 | Fein et al. | 715/255 |
| 6,574,792 B1 | * | 6/2003 | Easton | 717/142 |
| 7,036,045 B2 | * | 4/2006 | Broussard et al. | 714/37 |
| 7,036,052 B2 | * | 4/2006 | Pierce et al. | 714/57 |
| 2004/0250175 A1 | * | 12/2004 | Draine et al. | 714/46 |
| 2006/0070027 A1 | * | 3/2006 | Schmelter | 717/114 |
| 2008/0163009 A1 | * | 7/2008 | Wintergerst et al. | 714/699 |

* cited by examiner

*Primary Examiner*—Gabriel L Chu
(74) *Attorney, Agent, or Firm*—Blakley, Sokoloff, Taylor & Zafman LLP

(57) ABSTRACT

A system and method are provided to provide enhanced exception messages for exceptions thrown by virtual machines. In one embodiment, an exception is detected when it is thrown at a virtual machine when a programming error is detected. A first message is associated to the exception, the first message including a default message. A request is received for a second message to be associated with the exception. The second message is associated to the exception in response to the request, the second message including an extended message explaining the exception.

21 Claims, 9 Drawing Sheets

METHOD AND SYSTEM FOR PROVIDING ENHANCED EXCEPTION MESSAGES FOR EXCEPTIONS THROWN BY VIRTUAL MACHINES

FIELD

Embodiments of the invention relate generally to the field of data processing systems. More particularly, the embodiments of the invention relate to provide enhanced exception messages for exceptions thrown by virtual machines.

BACKGROUND

It is well-known that computer programs often generate program errors during execution. Typically, when an error occurs, an exception corresponding to the error is thrown, but the exception merely indicates that the error has occurred without providing any additional details that a user (e.g., developer, administrator, programmer, etc.) can use to not only identify the error, but also determine its source to track down the problem and find a solution for it. Thus, a user is required to manually search the program to resolve the error. This process is not only slow, tedious, and costly, but also could result in more errors as it is prone to human error. One conventional way is to use extended stack traces by recording the values of local variables. However, this conventional method of using extended stack traces is not sufficient. For example, in cases of a null exception, extended stack traces cannot indicate which variable (e.g., <write(getBytes( ).length>, <getObject( ).hashCode( )>, etc.) returned a null value by merely providing the values of local variables. Furthermore, extended stack traces impose heavy performance penalties when the exceptions are created.

SUMMARY

A system and method are provided to provide enhanced exception messages for exceptions thrown by virtual machines. In one embodiment, an exception is detected when it is thrown at a virtual machine when a programming error is detected. A first message is associated to the exception, the first message including a default message. A request is received for a second message to be associated with the exception. The second message is associated to the exception in response to the request, the second message including an extended message explaining the exception.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
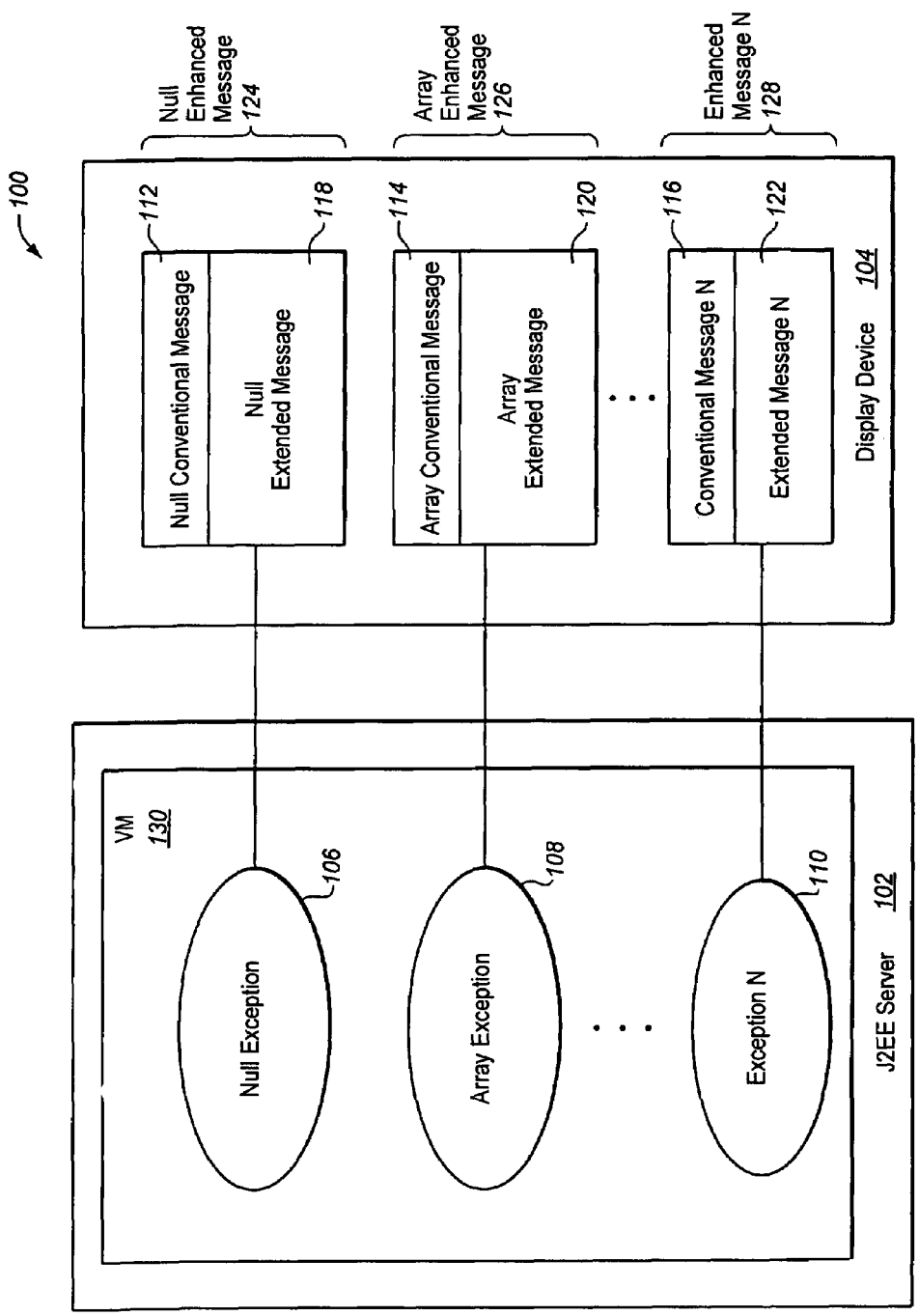
FIG. 1 illustrates an embodiment of an exception message enhancement mechanism for generating enhanced messages for exceptions relating to programming errors.

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

For an application that contains thousands of objects and classes, merely an indication of an error is not sufficient, unless a significant amount of manual analysis is performed by the user. Merely knowing that an error has occurred is one thing, but having additional information the further explains the error and identifying the object or variable that might be the source of the error is another thing. In one embodiment, when an error occurs and an exception is thrown, the relevant application and the VM is not restarted and any necessary and relevant information is collected and stored so that it can be used for post-error analysis. Furthermore, the additional CPU resources are only used when an enhanced message is requested for an exception and the corresponding extended exception message is generated. Using this technique, exceptions that are just cached and not further examined are processed relatively faster. Additionally, Java programs can take advantage of this mechanism without having to extract additional code (unlike when using the extended stack traces technique). Generating and using an enhanced message for an error exception can help save a use from performing manual analysis of a large amount of data to determine the source that is causing the error.

Although null exceptions (e.g., <NullPointerException>) and array exceptions (e.g., <ArrayIndexOutOfBoundsException>) are used throughout this document, they are merely used as examples for brevity, simplicity, and clarity. It is, however, contemplated that the mechanisms and techniques described throughout this document can be used for any number of errors and exceptions in any number of programming environments including, but not limited to, a Java environment. A null exception typically refers to an exception relating to a null pointer. The term "null pointer" refers to the values that are used to define an invalid pointer. In the Java environment, the null pointer is used as a linked object termination indicator, and it is also used to initialize unassigned pointer variables so that an attempted access through an unassigned pointer value can be detected. Thus, pointer variables are generally initialized to the null pointer and reference nodes in the heap memory. For example, a null exception can be caused by passing a null string to the Graphics.drawString( ) method in the Sun Java Runtime Environment (JRE) when running an applet in a browser using the Sun JRE, and the null exception is thrown by the java.awt.Graphics.drawString( )method. An array exception may be thrown when a code is run without specifying a parameter (e.g., <java BadFileAccess>) when checking for runtime errors of the code. The array exception may be thrown by the reference to args[0] in the program.

FIG. 1 illustrates an embodiment of an exception message enhancement mechanism (mechanism) 100 for generating enhanced messages 124-128 for exceptions 106-110 relating to programming errors. Exceptions 106-110 are thrown at VM 130 (e.g., JVM) residing at J2EE server 102 in response to programming errors. The illustrated exceptions 106-110 include a null exception 106 (e.g., <NullPointerException>), an array exception 108 (e.g., <ArrayIndexOutOfBoundsException>), and any other exception, exception N 110, thrown by Java VM 130. Each time an exception 106-110 is thrown, a default/pre-allocated conventional exception message (conventional message) 112-116 corresponding to the exception 106-110 is provided and displayed via a display device 104. For example, when a null exception 106 is thrown, a default corresponding null conventional message 112 is thrown. Similarly, when an array exception 108 is thrown, a default corresponding array conventional array message 114 is thrown. In one embodiment, mechanism 100 is provided for enhancing default conventional messages 112-116 into enhanced exception messages (enhanced messages) 124-128 by generating extended exception messages (extended messages) 118-122 and associating them with conventional messages 112-116.

Conventional messages 112-116 include default messages that merely provide an indication that an error has occurred and an exception 106-110 is thrown, without providing any additional information to help the user with troubleshooting. In rare cases, such as in the case of a null exception 106, the conventional message 112 may indicate the line number where the error has occurred, but still no cause of the error or the specific source of the error is provided. For example, the following fragment of a Java program can throw a null exception 106 as follows: OutputStream stream=getstream( ); File file=getFile( ); stream.writer(file.getName( ) .getBytes( ), 0, file.list( ) .length). If a null exception 106 is thrown for this code, the only information that the conventional message 112 may provide is the line number where the null exception 106 occurred. However, for example, in this cases, there are four possible causes for this null exception 106 and they are as follows: (1) stream could be null, so when invoking stream.write( ), the exception 106 can be thrown; (2) file could be null, so when invokingfile.getName( ), the exception 106 can be thrown; (3) file.getBytes( ) could return null, so when invoking getBytes( ), the exception 106 can be thrown; and (4) file.list( ) could return null, so when getting the length of the array, the exception can be thrown. Since this type of code is common in Java, a conventional message 112 is entirely insufficient in helping a user track down is the real cause or causes of the error for which a null exception 106 may be thrown.

In one embodiment, the additional information to form extended messages 118-122 is extracted and, to save space and time during the creation of the exception object, instead of storing all information, including the line number and the name of the method and class, merely the byte code index (bci), which is the program counter in the byte code of the Java method and a reference to the method are stored. This bci-based information is then used to form extended messages 118-122 that include the information in human-readable form to help the user track down the exact position of exceptions 106-110. Nevertheless, using the null exception example described above, the following list of bci's represents the disassembly of the relevant part of the extracted bci-based information: (1) 4: aload__1; (2) 5: aload__2; (3) 6: invokevirtual #19; //Method java/io/File.getName:( )Ljava/lang/String; (4) 9: invokevirtual #25; //Method java/lang/String.getBytes:( )[B; (5) 12: iconst__0; (6) 13: aload__2; (7) 14: invokevirtual #31; //Method java/io/File.list:( )[Ljava/lang/String; (8) 17: arraylength; and (9) invokevirtual #35; //Method java/io/OutputStream.write:([BII)V. Here a null exception 106 could be generated at bci 6, 9, 17 and 18, while bci 14 may not generate an exception since a null file variable alone would cause an exception at bci 6).

Since the bci-based information can be rather difficult for the user to use and understand, using the actual byte code at VM 130, the byte code at the bci of exceptions 106-110 is analyzed to generate human-readable messages that are then provided via extended messages 118-122. The human-readable messages describe what caused a particular, exception 106-110 and are easily obtained by the user via extended messages 118-122 via a display device 104 and read and analyzed as necessary. Providing extended messages 118-122 that are in human-readable form are also necessary to avoid any additional complications that may arise when the byte code may be modified by VM 130 to, for example, satisfy the Gosling property or by profiling and monitoring tools.

Once again, using the null exception example discussed above, if the null exception 106 occurs at bci 6, the VM 130 detects that a method was to be called which caused the null exception 106. A corresponding extended message 118 of human-readable form is then generated that contains additional relevant information, such as the name of the method to be invoked. Similarly, if the null exception occurs at bci 17, the length of an array is to be determined that is then contained in the extended message 118. Further, the name of the file can also be added to the exception message 118 if the null exception 106 is analog and happens while obtaining an instance filed of an object. In many cases, this information alone could be sufficient to get the exact location of the null exception 106; however, even more information is extracted and provided in via the exception message 118.

Considering System.out.prinln (getBytes( ). length+" "+test.length), there are two bci's where an exception can occur when getting the array length. A data flow analysis is performed of the two bci's to determine how the null reference that caused the null exception 106 was created. The data flow analysis is performed by iterating over byte codes and record the state of the operand stack. Whenever a byte code pushes a reference on the operand stack, that position in the stack is annotated with the bci of the causing instruction such that for each reference on the operand stack the instruction that stored the null reference is known. Further, information about the instruction that pushed the null reference on the stack is also obtained. The process for data flow analysis can be performed repeatedly for certain instructions to obtain additional parameters (e.g., an instance method invoked on an object).

Considering another code fragment, such as stream.getBytes( ).length, if getBytes( ) returns null, the following human-readable message is generated and provided via the extended message 118: "while trying to get the length of an array returned by getBytes( . . . ) which was invoked on an object loaded from local variable stream". This human-readable message removes any remaining ambiguities about the null exception 106 and its location, the cause, etc.

For example, for a single code fragment, such as stream.write(file.getBytes( ).length, fileStream.maxBytes), several causes, such as stream, file, file.getBytes( ), and fileStream, could be or returned as null, leading to a null exception 106. In one embodiment, mechanism 100 analyzes the byte code and generate following human-readable messages that correspond to each of the possible causes and are provided via an extended message 118 to the user: (1) "while trying to invoke the method write( . . . ) of an object loaded from local variable stream"; (2) "while trying to invoke the method getBytes( . . . ) of an object loaded from local variable file"; (3) "while trying to get the length of an array returned by method getbytes( . . . ) invoked of on object loaded from local variable file"; and (4) "while trying to read from field maxBytes of an object loaded from local variable fileStream". This extended message 118 along with the conventional message 112 forms an enhanced message 124 that is provided to the user via a display device 104.

Referring now to array exception 108 (e.g., <ArrayIndexOutOfBoundsException>), there are two types of instructions that can cause an array exception 108. These two types of instructions include: (1) the instruction to load from an array; and (2) the instruction to store from an array. In one embodiment, mechanism 100 is used to extract additional information about such instructions and such information is then provided in human-readable form as an extended message 120. For example, first, a determination is made as to which of the two instructions it is that may have caused an array exception 108 and, second, the type of array is determined. There are different instructions to load/store from byte, short, char, int, float, long, double or object arrays. This is used as another differentiator. Another set of information that is extracted and is analog to that of the null exception 106 includes specifying how the index and the object of the array were retrieved. For example, considering a code fragment, such as return a[i] [getBytes( ).length], mechanism 100 extracts relevant information relating to the code and generates a human-readable medium, such as "while reading from an int array (with an index returned as the array length of an array returned by the static method getBytes( )) which was returned by reading from an object array (with an index local from the local variable i) which itself was loaded from the local variable a". Since such a message can potentially get very large and even confusing, its "backtracking" length can be limited.

Considering another code segment, such as System.out.println("Test"+a[i]+" "+b[i]Y]), an analog problem may exist for array exception 108. Here, i and j are indices, while a and b are arrays. If an array exception 108 occurs, it could be due to any of the following: (1) the index i is invalid for array a; (2) the index i is invalid for array b; and (3) the index j is invalid for array b[i]. In other words, any of the scenarios may result in the throwing of the array exception 108 and, using the mechanism 100, relevant information providing information about the indices and arrays and the three scenarios is extracted, compiled, analyzed, and provided in human-readable form as an extended message 120, while a conventional message 114 may merely provide a value of the invalid index which is entirely insufficient in knowing the cause of the problem and necessary details about why and where the array exception 108 was thrown.

In one embodiment, an analog message is presented for the array exception 108 by defining where the index came from (e.g., loaded from a local variable or returned from a method) and where the array itself came from. Any additional information is generated from two bits of information stored in the stack trace. The bci of the method where the exception occurs and the method itself. The method is used to access the byte code of the method. By examining the instruction at the bci, the operation that caused the array exception 108 is identified (e.g., invoking a method, accessing a field, and getting the length of the error). Also, depending on the instruction as determined, additional information can be gathered. For example, if the array exception 108 has occurred during the writing of an instance field, data flow analysis can be performed to determine the instruction that loaded the reference on which the method was to be invoked. This can be, for example, an instruction which loads from a local variable, in which case, the extended message 120 may include the following: "with trying to invoke method X of an object loaded form local variable Y". Here, X and Y represent name or identification of the method and the variable, respectively.

Using the example code segment of System.out.println ("Test"+a[i]+" "+b[i][j]) for the array exception 108, one or more of the following three human-readable messages may be provided as the extended message 120: (1) "while reading from an array (loaded from local variable a) with an index loaded from local variable i"; (2) "while reading from an array (loaded from local variable b) with an index loaded from local variable i"; and (3) "while reading from an array (loaded form an array (which itself was loaded from local variable b) with an index loader from local variable i) with an index loaded from local variable j". The extended message 120 and the conventional message 114 are together provided as an enhanced message 126 to the user via a display device 104. Furthermore, in one embodiment, mechanism 100 is not triggered (e.g., extended messages 118-122 are not generated to be included in enhanced messages 124-128) until a request for an enhanced message 118-122 is placed and received. This is so that no system overhead occurs until the request is received and extended messages 124-128 are generated in response to the request.

Figure 2A:
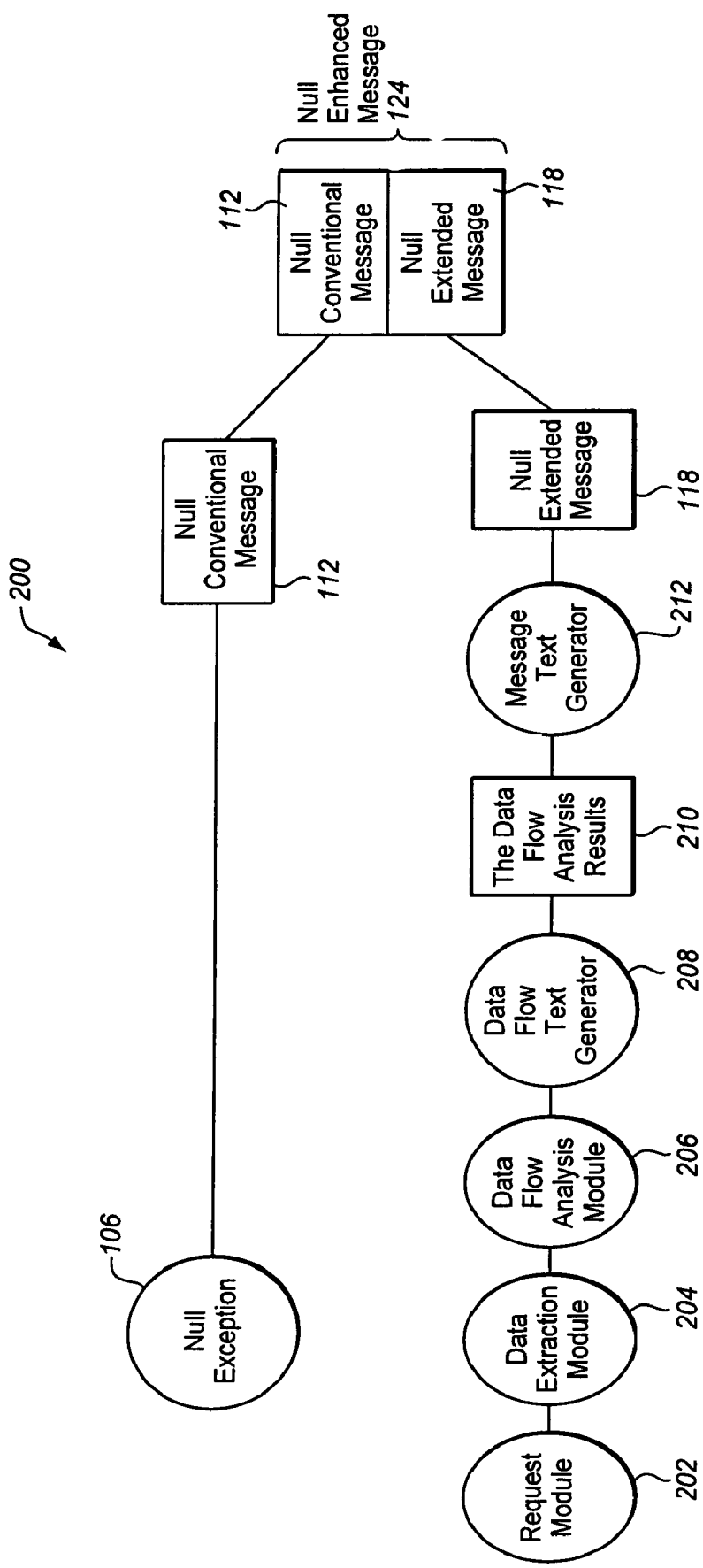
FIG. 2A illustrates an embodiment of an exception message enhancement mechanism for generating an enhanced message for a null exception relating to a programming error.

FIG. 2A illustrates an embodiment of an exception message enhancement mechanism (mechanism) 200 for generating an enhanced message 124 for a null exception 106 relating to a programming error. A null exception 106 is thrown at a VM as a result of a programming error with an application running on the VM. A conventional message 112 is created as a result of the thrown exception 106. The conventional message 112 may contain very limited information about the null exception 106, such as the line number of the program where the null exception 106 was thrown. Such information is, however, entirely insufficient to track down the null exception 106 and subsequently those programming objects and variables that are the real culprits so that a proper troubleshooting of the programming error can be performed to eradicate it from future programming. However, to save and preserve system resources (e.g., CPU resources, such as power, memory, etc.), in one embodiment, a null extended message 118 is created in response to a request. This way, a null extended message 118 is not created each time a null exception 106 is thrown and the various system resources are saved and preserved. In another embodiment, a null extended message 118 may be created automatically each time a null exception 106 is thrown for efficiency and time saving.

In the illustrated embodiment, a null exception 106 is thrown, and a request from a client is received at the server to generate a null extended message 118 in response to the thrown null exception 106. The request is received at a request module 202. In response to the received request, relevant information (as described with reference to FIG. 1) about the null exception 106 is extracted by a data extraction module 204. The information is extracted or collected from the VM where the null exception 106 is thrown. Some of the information may be automatically extracted and stored at the VM, while other information is generated by analyzing the thrown null exception 106 and then extracted from the VM. Once the relevant information is extracted, a data flow analysis of the information is performed using a data flow analysis module 206. The data flow analysis is used to find out the possible paths for the information used at a specific byte code index, which is the program counter in the byte code of a Java method.

A data flow text generator 208 is used to generate a text describing results of the data flow analysis 210 for parameters. Since the bci-based analysis of the information is rather difficult for a user to perform, a text message is generated such that the information is made available in a human-readable format for the user. A message text generator 212 is then used to, first, perform an appropriate and necessary data flow analysis for the given exception type, such as the null exception 106. Second, the message text generator 212 creates a human-readable text message by using the data flow text generator 208, which describes the exception in greater details. The human-readable text message having the relevant information about the null exception 106 is provided as the null extended message 118 that was requested by the client. The null extended message 118 provides the relevant information that details and explains the null exception 106. In one embodiment, the null extended message 118 is associated with the null conventional message 112 to provide a null enhanced message 124. In another embodiment, the null extended message 118 may be provided without the null conventional message 112.

In one embodiment, the illustrated mechanism 200 is performed at a J2EE server which includes a VM (e.g., JVM) wherein the null exception 106 is thrown. Furthermore, in one embodiment, the creating, associating, and providing of the null enhanced message 124, using this mechanism 200, is performed in runtime (e.g., without restarting the VM at issue), which does not require any overhead, making this technique useful for even those productions systems where exception may take relatively longer to surface.

Figure 2B:
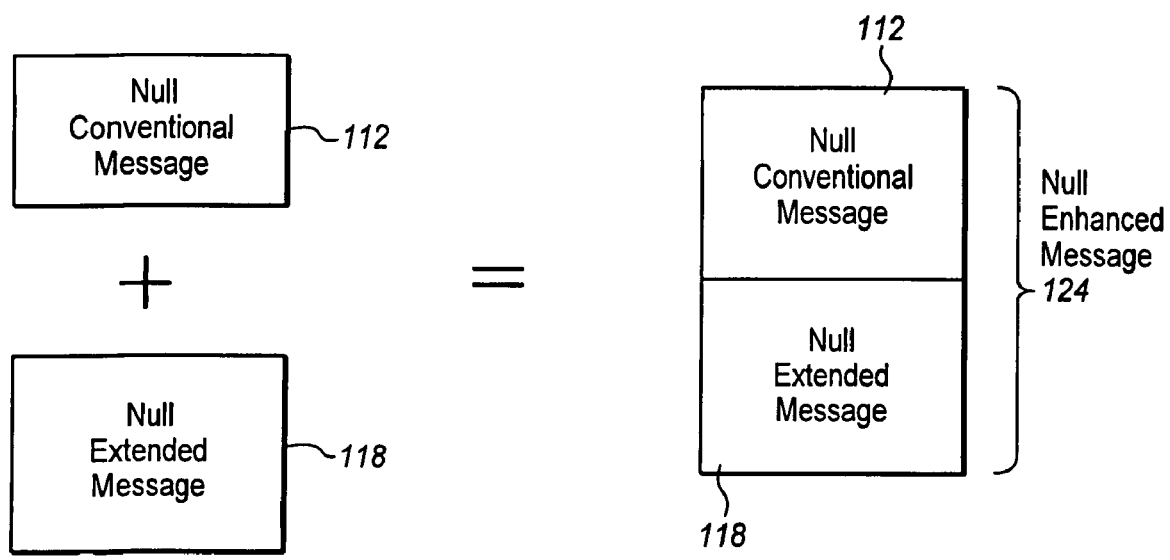
FIG. 2B illustrates an embodiment of a null enhanced message.

FIG. 2B illustrates an embodiment of a null enhanced message 124. In the illustrated embodiment, a null extended message 118 is generated and associated with a null conventional message 112. Together, the two messages 112, 118 are combined into a null enhanced message 124 that is provided to a user. In one embodiment, the null enhanced message 124 is provided without the null conventional message 112. For example, the null conventional message 112 may be provided separately and without having the null extended message 118 associated with it such that the null extended message 118 provides the relevant information and details about a null exception 106 without being associated with its conventional message 112.

Figure 3A:
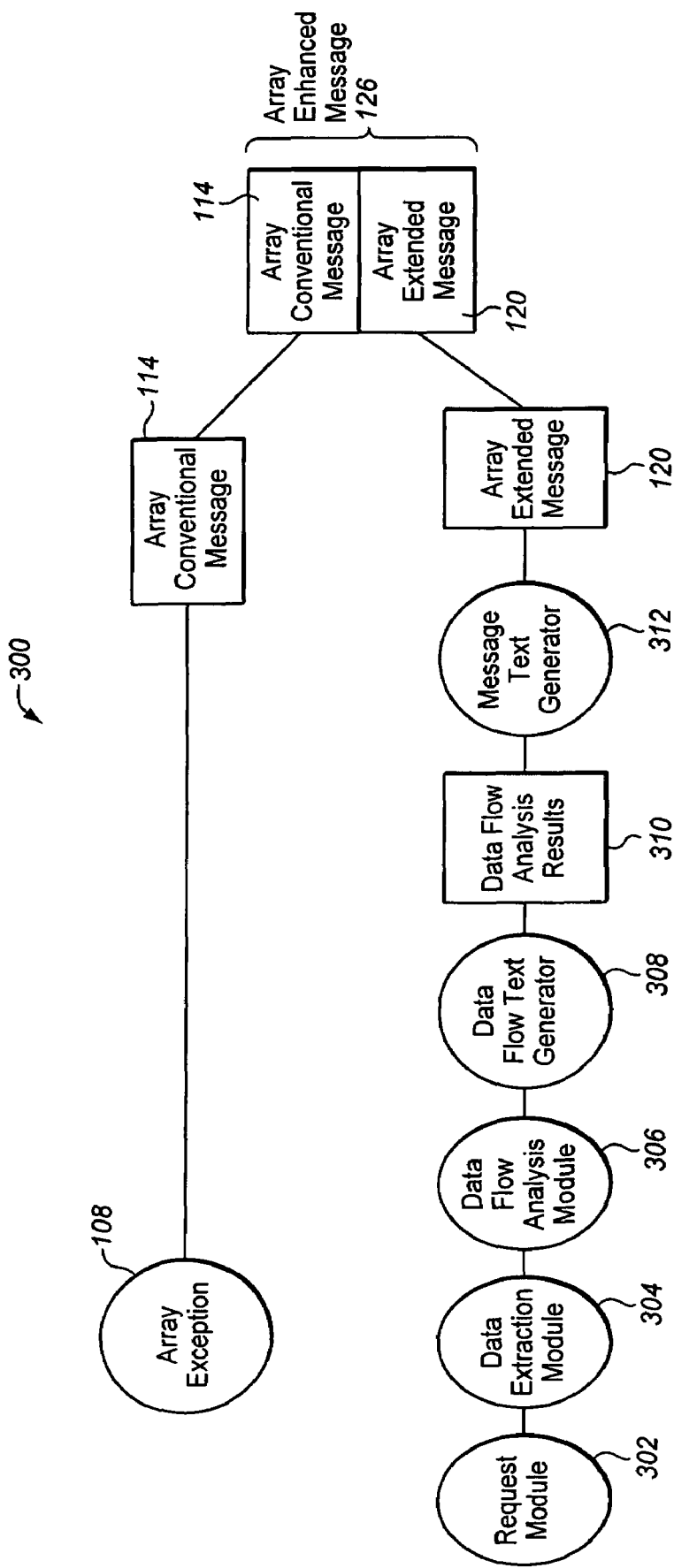
FIG. 3A illustrates an embodiment of an exception message enhancement mechanism for generating an enhanced message for an array exception relating to a programming error.

FIG. 3A illustrates an embodiment of an exception message enhancement mechanism (mechanism) 300 for generating an enhanced message 126 for an array exception 108 relating to a programming error. An array exception 108 is thrown at a VM as a result of a programming error with an application running on the VM. A conventional message 114 is created as a result of the thrown exception 108. The conventional message 114 may contain very limited information about the array exception 108, such as the line number of the program where the array exception 108 was thrown. Such information is, however, entirely insufficient to track down the array exception 108 and subsequently those programming objects and variables that are the real culprits so that a proper troubleshooting of the programming error can be performed to eradicate it from future programming. However, to save and preserve system resources (e.g., CPU resources, such as power, memory, etc.), in one embodiment, an array extended message 120 is created in response to a request. This way, an array extended message 120 is not created each time an array exception 108 is thrown and the various system resources are saved and preserved. In another embodiment, an array extended message 120 may be created automatically each time an array exception 108 is thrown for efficiency and time saving.

In the illustrated embodiment, an array exception 108 is thrown, and a request from a client is received at the server to generate an array extended message 120 in response to the thrown array exception 108. The request is received at a request module 302. In response to the received request, relevant information (as described with reference to FIG. 1) about the array exception 108 is extracted by a data extraction module 304. The information is extracted or collected from the VM where the array exception 108 is thrown. Some of the information may be automatically extracted and stored at the VM, while other information is generated by analyzing the thrown array exception 108 and then extracted from the VM. Once the relevant information is extracted, a data flow analysis of the information is performed using a data flow analysis module 306. The data flow analysis is used to find out the possible paths for the information used at a specific byte code index, which is the program counter in the byte code of a Java method, A data flow text generator 308 is used to generate a text describing results of the data flow analysis 310 for parameters. Since the bci-based analysis of the information is rather difficult for a user to perform, a text message is generated such that the information is made available in a human-readable format for the user. A message text generator 312 is then used to, first, perform an appropriate and necessary data flow analysis for the given exception type, such as the array exception 108. Second, the message text generator 312 creates a human-readable text message by using the data flow text generator 308, which describes the exception in greater details. The human-readable text message having the relevant information about the array exception 108 is provided as the array extended message 120 that was requested by the client. The array extended message 120 provides the relevant information that details and explains the array exception 108. In one embodiment, the array extended message 120 is associated with the array conventional message 114 to provide an array enhanced message 126. In another embodiment, the array extended message 120 may be provided without the array conventional message 114.

In one embodiment, the illustrated mechanism 300 is performed at a J2EE server which includes a VM (e.g., JVM) wherein the array exception 108 is thrown. Furthermore, in one embodiment, the creating, associating, and providing of the array enhanced message 126, using this mechanism 300, is performed in runtime (e.g., without restarting the VM at issue), which does not require any overhead, making this technique useful for even those productions systems where exception may take relatively longer to surface.

Figure 3B:
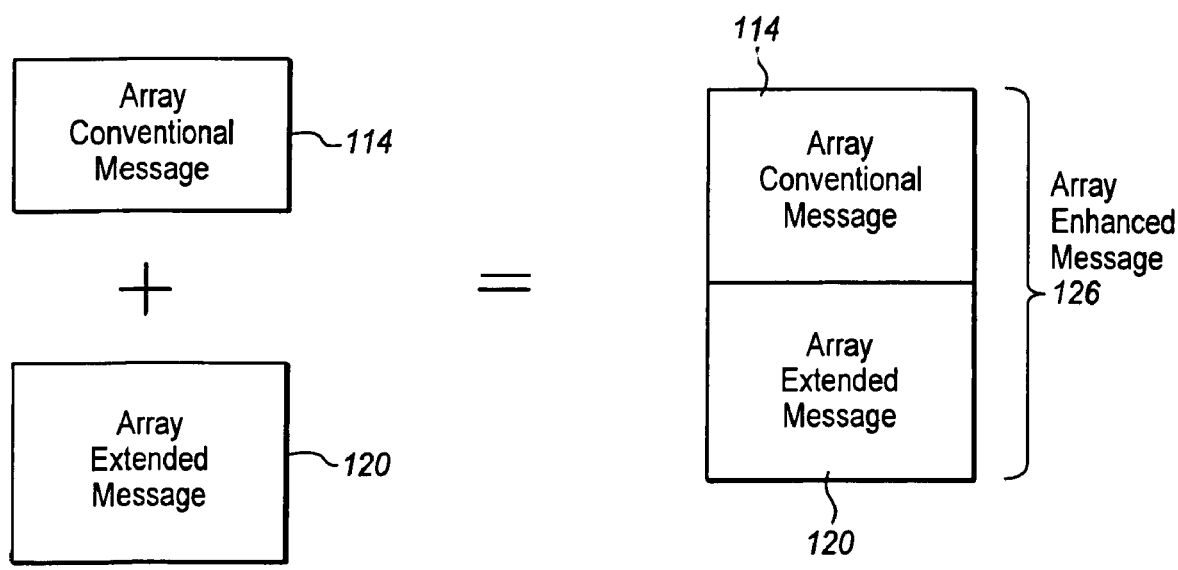
FIG. 3B illustrates an embodiment of an array enhanced message.

FIG. 3B illustrates an embodiment of an array enhanced message 126. In the illustrated embodiment, an array extended message 120 is generated and associated with an array conventional message 114. Together, the two messages 114, 120 are combined into an array enhanced message 126 that is provided to a user. In one embodiment, the array enhanced message 126 is provided without the array conventional message 114. For example, the array conventional message 114 may be provided separately and without having the array extended message 120 associated with it such that the array extended message 120 provides the relevant information and details about an array exception 108 without being associated with its conventional message 114.

Figure 4:
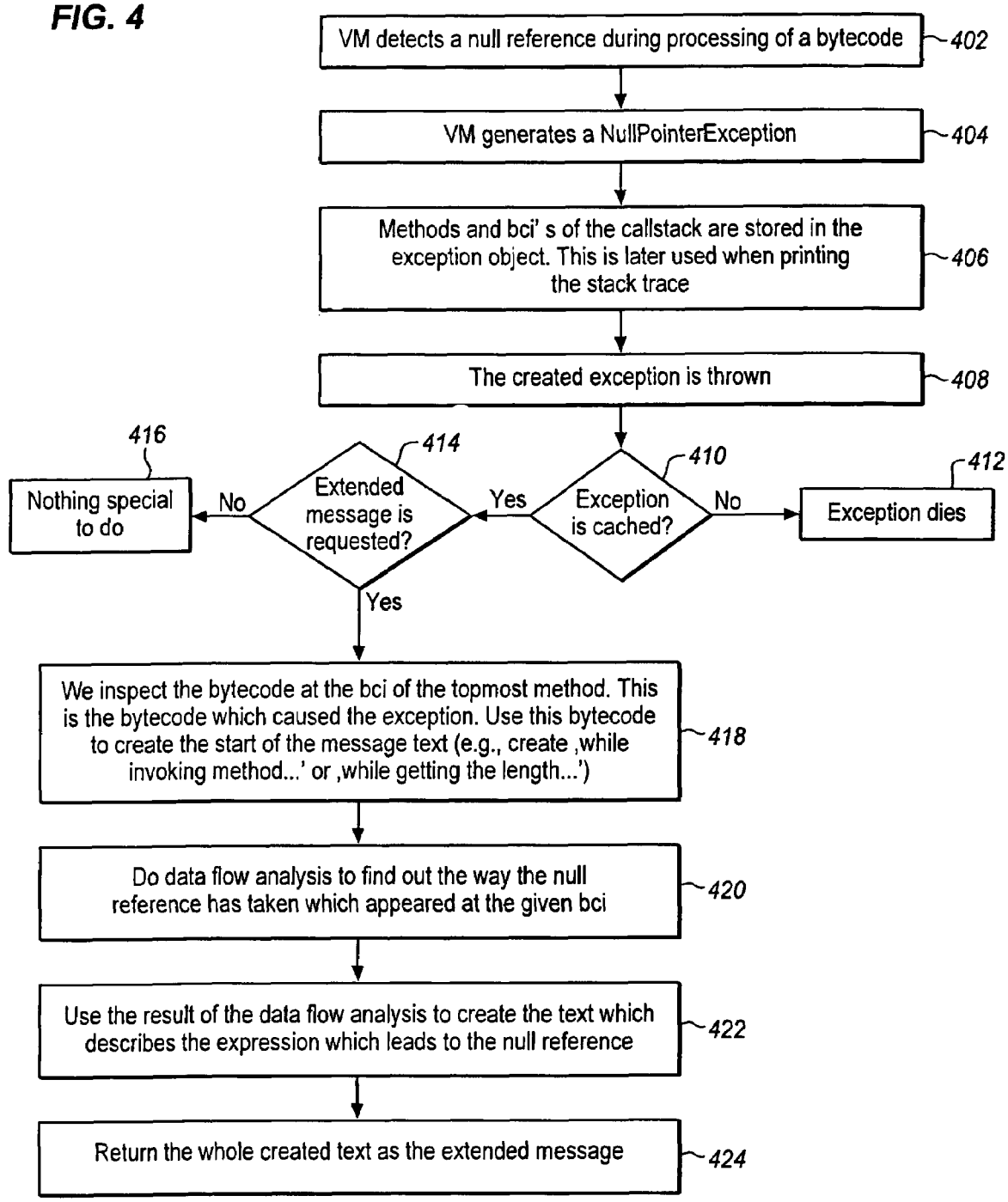
FIG. 4 illustrates an embodiment of a process for generating a null extended message.

FIG. 4 illustrates an embodiment of a process for generating a null extended message. To enhance a null exception message, a null extended message is generated and then associated with a default null conventional message to provide a null enhanced message that provides detailed information about a thrown null exception (e.g., <NullPointerException>). At processing block 402, a VM detects a null reference during processing of a bytecode. At processing block 404, the VM generates a null exception. The methods and bci's of the callstack are stored in an exception object at processing block 406. This is later used when printing the stack trace. The generated null exception is thrown at the VM at processing block 408.

At decision block 410, a determination is made as to whether the null exception is caught. If not, the null exception dies away at processing block 412. If the null exception is caught, at decision block 414, a determination is made as to whether an extended message for the null exception is requested. If the request for the null extended message is not received, nothing further is done, while the null exception is thrown with a default null conventional message at processing block 416. If the null extended message is requested, at processing block 418, the bytecode at the bci of the topmost method is inspected. This bytecode refers to the bytecode that caused the null exception. Thus, this bytecode is used to create the start of the message text for the null extended message, such as "while trying to invoke the method write( . . . ) of an object loaded form local variable stream", and the like. A data flow analysis is then performed on the information gathered (and analyzed using the bytecode) to determine the way the null reference has taken which appeared at the given bci at processing block 420. At processing block 422, the result of the data flow analysis is used to create the text message that describes the text expression that leads to the null reference. At processing block 424, the whole created text message is returned as the null extended message. The null extended message is then associated with the null conventional message to provide as the null enhanced message to the user.

Figure 5:
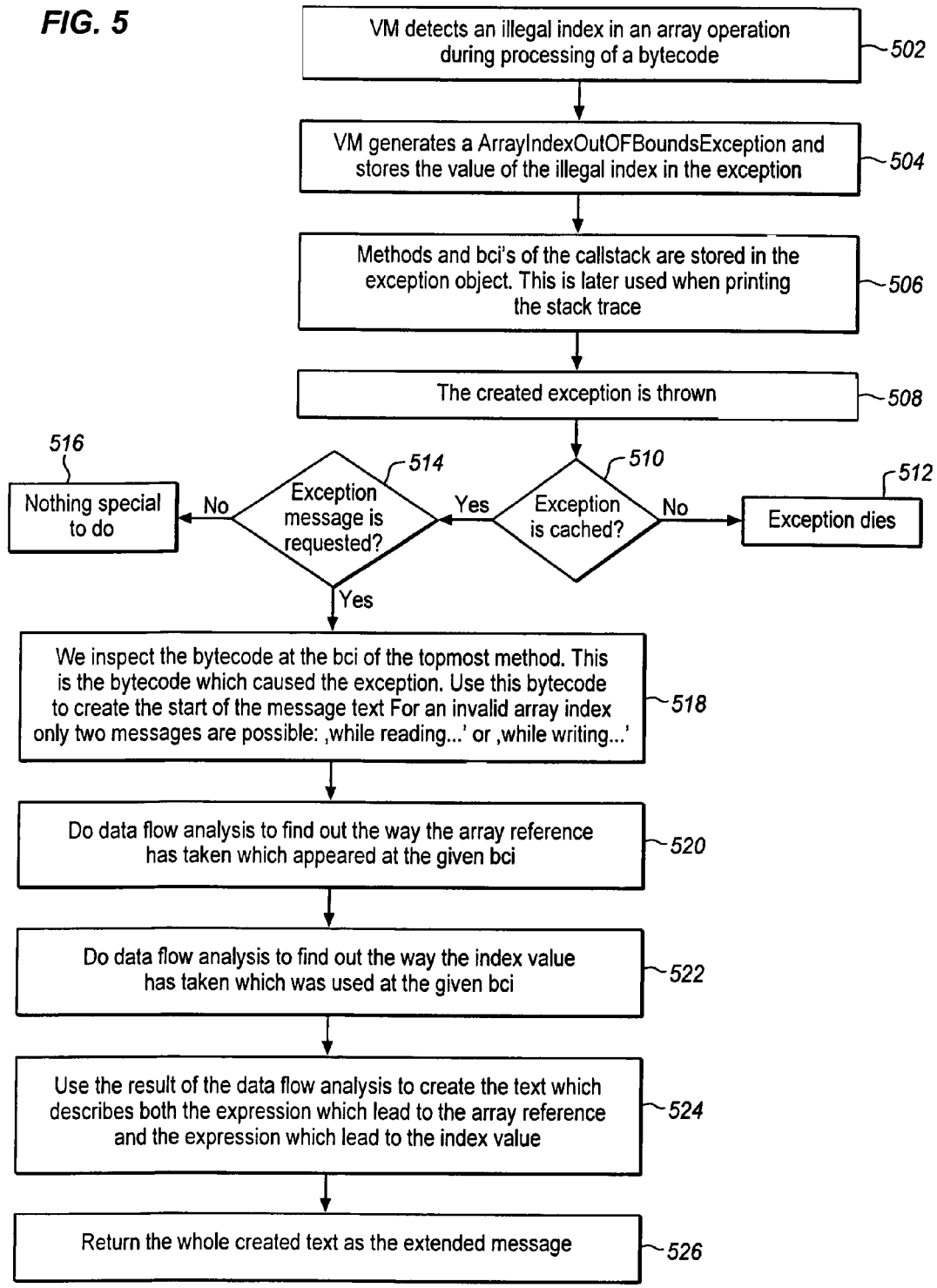
FIG. 5 illustrates an embodiment of a process for generating an array extended message.

FIG. 5 illustrates an embodiment of a process for generating an array extended message. In one embodiment, to enhance an array exception message, an array extended message is generated and then associated with a default array conventional message to provide an array enhanced message that provides detailed information about a thrown array exception (e.g., <ArrayIndexOutOfBoundsException>). At processing block 502, a VM detects an illegal index in an array operation during processing of a bytecode. At processing block 504, the VM generates an array exception and stores the value of the illegal index in the array exception. The method and bci's of the callstack are stored in an exception object at processing block 506. This information is later used when printing the stack trace. The generated array exception is then thrown at the VM at processing block 508.

At decision block 510, a determination is made as to whether the array exception is caught. If not, the array exception dies away at processing block 512. If the array exception is caught, at decision block 514, a determination is made as to whether an extended message for the array exception is requested. If the request for the array extended message is not received, nothing further is done, while the array exception is thrown with a default array conventional message at processing block 516. If the array extended message is requested, at processing block 518, the bytecode at the bci of the topmost method is inspected. This bytecode refers to the bytecode that caused the array exception. Thus, this bytecode is used to create the start of the message text for the array extended message. For an invalid array index, two types of text messages are used, such as "while reading . . . " and "while writing . . . ." A data flow analysis is then performed on the information gathered (and analyzed using the bytecode) to determine the way the array reference has taken which appeared at the given bci at processing block 520. At processing block 522, the data flow analysis is performed to find out the way the index value has taken which was used at the given bci. At processing block 524, the results of the data flow analysis is used to create the text message that describes the text expression that describes both the expression that leads to the array reference and the expression that leads to the index value. At processing block 526, the whole created text message is returned as the array extended message. The array extended message is then associated with the array conventional message to provide as the array enhanced message to the user.

In one embodiment, enhanced messages 124-128, including extended messages 118-122, and any other relevant data may be displayed for the benefit of users via a graphical user interface (GUI) at a display device 104 and/or stored at a database or file system for subsequent retrieval and analysis. Although, for example, J2EE server 102, Java VM, Java heap, Java errors and exceptions, and Java programming and programming environments are discussed for simplicity and brevity, it should be noted, however, that the underlying principles and embodiments of the present invention may be implemented within any type of object-oriented and runtime environments. Moreover, it should be noted that the memory requirements used in this example do not necessarily reflect the real values that the example program would actually produce.

A VM (e.g., VM 130 of FIG. 1) is an example of a runtime system. A VM refers to an abstract machine that includes an instruction set, a set of registers, a stack, a heap, and a method area, such as a machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. For example, a Java source program can be compiled into program code, such as bytecode. Bytecode can be executed on a VM, such as JVM 130, running on any processor or platform. The JVM can either interpret the bytecode one instruction at a time, or the bytecode can be further compiled for the real processor or platform using a just-in-time (JIT) compiler.

The illustrated VM 130 of FIG. 1 includes a JVM, which is used as an example; however, other examples of VMs, which can be used in various embodiments, include Advanced Business Application Programming (ABAP) language VMs, Common Language Runtime (CLR) VMs, and the like. ABAP is a programming language for developing applications for SAP systems, such as SAP R/3 system, which is a widely installed business application system developed by SAP AG of Walldorf, Germany. The CLR is a managed code execution environment developed by Microsoft Corp. of Redmond, Wash. For simplicity and brevity, the discussion in this document focuses on virtual machines, and in particular Java virtual machine 130, but it is to be understood that the techniques described herein can also be used with other types of runtime systems.

A runtime system includes a code execution environment that executes instructions or code in user requests and that provides runtime services for that code. Code runtime services may include functionality, such as process, thread, and memory management (e.g., laying out objects in the server memory, sharing objects, managing references to objects, and garbage collecting objects). Enhanced runtime services may include functionality, such as error handling and establishing security and connectivity.

The server 102 of FIG. 1 is shown to include a J2EE server/engine/node, which supports Enterprise Java Bean ("EJB") components and EJB containers (at the business layer) and Servlets and Java Server Pages ("JSP") (at the presentation layer). It is understood that processes taught by the discussion above can be practiced within various software environments such as, for example, object-oriented and non-object-oriented programming environments, Java based environments (such as a J2EE environment or environments defined by other releases of the Java standard), other environments (e.g., a .NET environment, a Windows/NT environment each provided by Microsoft Corporation), and the like.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules, components, or elements described throughout this document, such as the ones shown within or associated with mechanisms 100, 200, 300 of FIGS. 1, 2A, and 3A, may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 6:
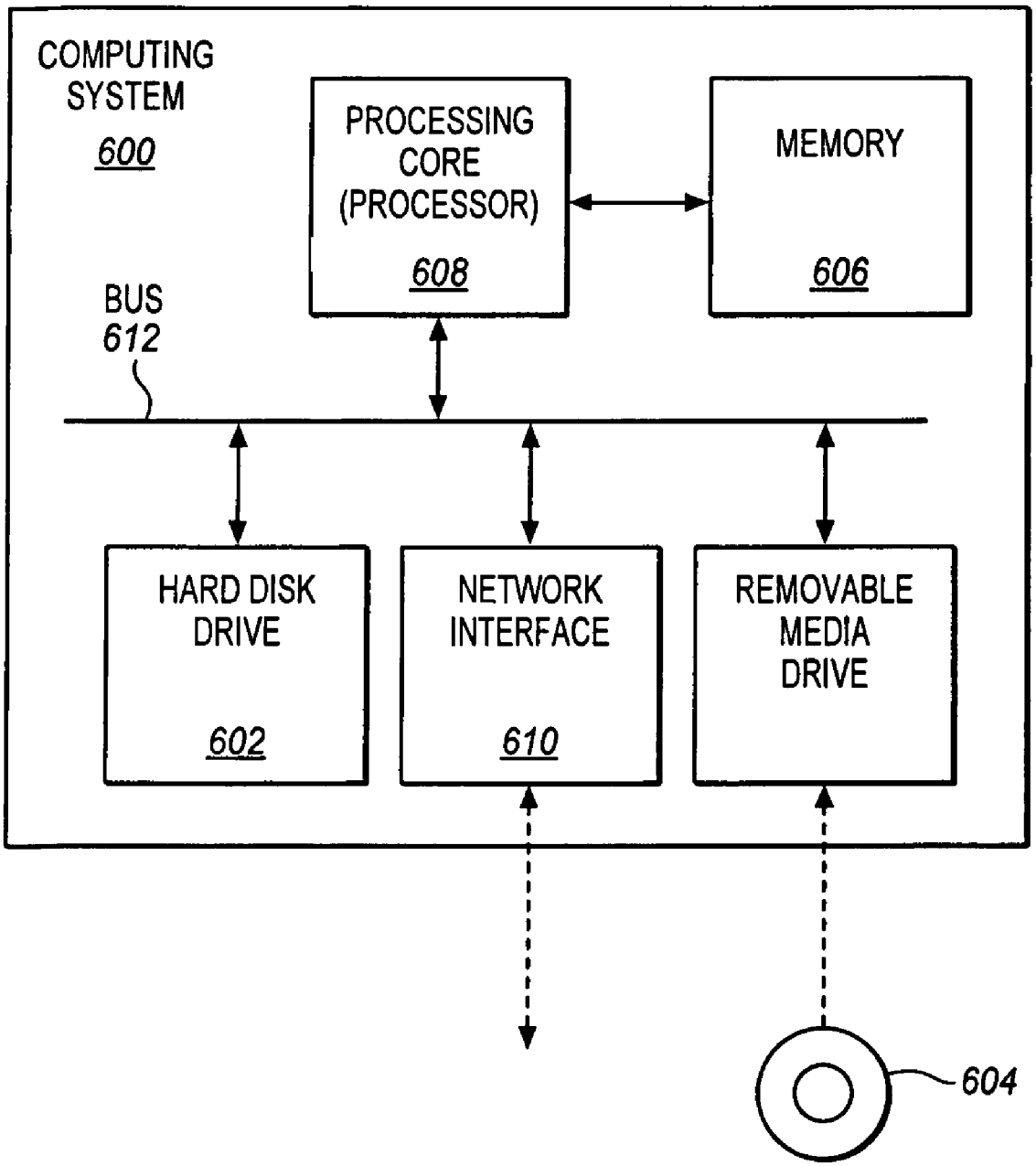
FIG. 6 illustrates an embodiment of a computing system.

FIG. 6 illustrates an embodiment of a computing system 600. Computing system 600 may be used for implementing one or more embodiments of the present invention and for executing program code stored by an article of manufacture. It is important to recognize that the computing system 600 represents merely of various computing system architectures that can be used for the same purposes. The applicable article of manufacture may include one or more fixed components (such as hard disk drive 602 or memory 606) and/or various movable components, such as compact disk (CD) ROM 604, a compact disc, a magnetic tape, and the like. To execute the program code, typically instructions of the program code are loaded into RAM 606. Then, processing core 608 executes the instructions. A processing core may include one or more processors and a memory controller function. A virtual machine or "interpreter" (e.g., JVM) may run on top of the processing core (architecturally speaking) to convert abstract code (e.g., Java bytecode) into instructions that are understandable to the specific processor(s) of processing core 608. Computing system 600 further includes network interface 610 and bus 612 to connect to other systems via a network and to have various components communicate with each other, respectively.

Figure 7:
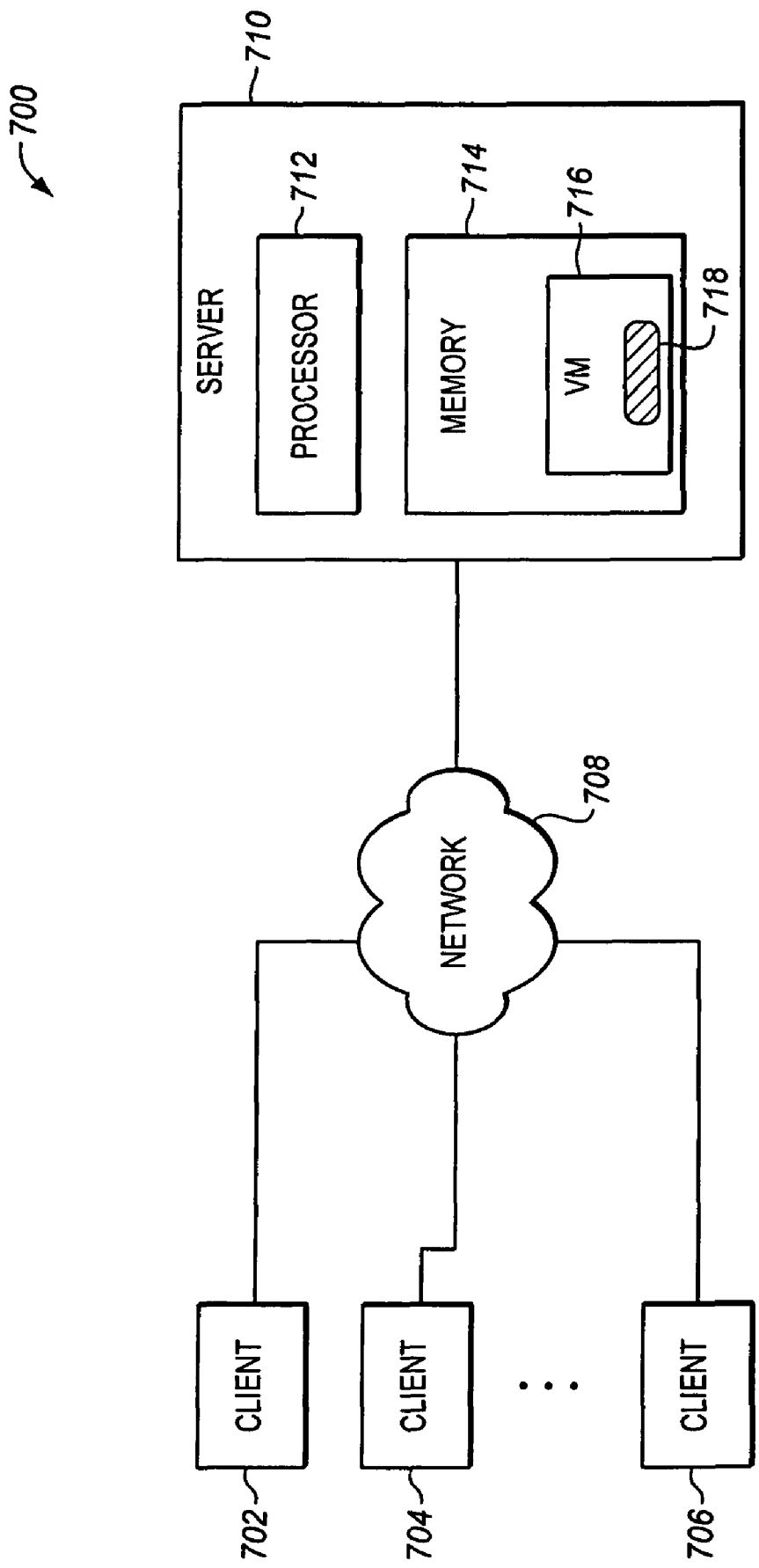
FIG. 7 illustrates an embodiment of a client/server network system employing a message enhancement mechanism.

FIG. 7 illustrates an embodiment of a client/server network system 700 employing a message enhancement mechanism 718. As illustrated, network 708 links server 710 with client systems 702-706. Server 710 includes programming data processing system suitable for implementing apparatus, programs, and/or methods in accordance with one or more embodiments of the present invention. Server 710 includes processor 712 and memory 714. Server 710 provides a core operating environment for one or more runtime systems (e.g., VM 716) at memory 714 to process user requests. Memory 714 may include a shared memory area that is accessible by multiple operating system processes executing in server 710. For example, VM 716 may include an enterprise server (e.g., a J2EE-compatible server or node, Web Application Server developed by SAP AG, WebSphere Application Server developed by IBM Corp. of Armonk, N.Y., and the like). The enterprise server at VM 716 may host an exception message enhancement mechanism 718. Memory 714 can be used to store an operating system, a Transmission Control Protocol/Internet Protocol (TCP/IP) stack for communicating over network 708, and machine executable instructions executed by processor 712. In some embodiments, server 710 may include multiple processors, each of which can be used to execute machine executable instructions.

Client systems 702-706 may execute multiple application or application interfaces. Each instance or application or application interface may constitute a user session. Each user session may generate one or more requests to be processed by server 710. The requests may include instructions or code to be executed on a runtime system, such as VM 716, on server 710, such as the requests made via the exception message enhancement mechanism 718 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:
   detecting a programming error relating to a software application running at an application server of a server computer system;
   associating a default message to an exception associated with the programming error;
   performing data analysis of one or more code sections of the software application associated with the programming error to form an extended message having an analysis of the programming error, wherein performing data analysis includes inspecting one or more bytecodes of the one or more code sections, wherein the one or more bytecodes are responsible for causing the programming error and are accessed via a byte code index corresponding to a top method of the software application;
   enhancing the exception by associating the extended message to the exception and the default message; and
   providing the enhanced exception having the associated default and extended messages.

2. The computer-implemented method of claim 1, wherein the default message comprises a conventional message relating to the programming error, and wherein the extended message comprises information relating to one or more of the one or more code sections, objects or methods causing the programming error, status of the software application when the programming error occurred, one or more solutions to correct or prevent the programming error, and a description of the programming error.

3. The computer-implemented method of claim 1, wherein performing data analysis comprises analyzing a code section of the software application associated with a null pointer error to form an extended null pointer message having an analysis of the null pointer error.

4. The computer-implemented method of claim 3, further comprising enhancing a null pointer exception having default null pointer message associated with the null pointer error by associating the extended null pointer message to the default null pointer message within the null pointer exception.

5. The computer-implemented method of claim 1, wherein performing data analysis comprises analyzing a code section of the software application associated with an array index out of bounds error to form an extended array index out of bounds message having an analysis of the array index out of bounds error.

6. The computer-implemented method of claim 5, further comprising enhancing an array index out of bounds exception having default array index out of bounds message associated with the array index out of bounds error by associating the extended array index out of bounds message to the default array index out of bounds message within the array index out of bounds exception.

7. The computer-implemented method of claim 1, wherein performing data analysis further includes translating the one or more bytecodes into a human-readable text message being included in the extended message.

8. A system comprising:
   a server computer system having an application server to run software applications, the application server to detect a programming error relating to a software application running at the application server;
   associate a default message to an exception associated with the programming error;
   perform data analysis of one or more code sections of the software application associated with the programming error to form an extended message having an analysis of the programming error, wherein performing data analysis includes inspecting one or more bytecodes of the one or more code sections, wherein the one or more bytecodes are responsible for causing the programming error and are accessed via a byte code index corresponding to a top method of the software application;
   enhance the exception by associating the extended message to the exception and the default message; and
   provide the enhanced exception having the associated default and extended messages.

9. The system of claim 8, wherein the default message comprises a conventional message relating to the programming error, and wherein the extended message comprises information relating to one or more of the one or more code sections, objects or methods causing the programming error, status of the software application when the programming error occurred, one or more solutions to correct or prevent the programming error, and a description of the programming error.

10. The system of claim 8, wherein the application server is further to data analyze a code section of the software application associated with a null pointer error to form an extended null pointer message having an analysis of the null pointer error.

11. The system of claim 10, wherein the application server is further to enhance a null pointer exception having default null pointer message associated with the null pointer error by associating the extended null pointer message to the default null pointer message within the null pointer exception.

12. The system of claim 8, wherein the application server is further to data analyze a code section of the software application associated with an array index out of bounds error to form an extended array index out of bounds message having an analysis of the array index out of bounds error.

13. The system of claim 12, wherein the application server is further to enhance an array index out of bounds exception having default array index out of bounds message associated with the array index out of bounds error by associating the extended array index out of bounds message to the default array index out of bounds message within the array index out of bounds exception.

14. The system of claim 8, wherein performing data analysis further includes translating the one or more bytecodes into a human-readable text message being included in the extended message.

15. A machine-readable storage medium comprising instructions which, when executed, cause a machine to:
   detect a programming error relating to a software application running at an application server of a server computer system;
   associate a default message to an exception associated with the programming error;
   perform data analysis of one or more code sections of the software application associated with the programming error to form an extended message having an analysis of the programming error, wherein performing data analysis includes inspecting one or more bytecodes of the one or more code sections, wherein the one or more bytecodes are responsible for causing the programming error and are accessed via a byte code index corresponding to a top method of the software application;
   enhance the exception by associating the extended message to the exception and the default message; and provide the enhanced exception having the associated default and extended messages.

16. The machine-readable storage medium of claim 15, wherein the default message comprises a conventional message relating to the programming error, and wherein the extended message comprises information relating to one or more of the one or more code sections, objects or methods causing the programming error, status of the software application when the programming error occurred, one or more solutions to correct or prevent the programming error, and a description of the programming error.

17. The machine-readable storage medium of claim 15, wherein the instructions when executed, further cause the machine to data analyze a code section of the software application associated with a null pointer error to form an extended null pointer message having an analysis of the null pointer error.

18. The machine-readable storage medium of claim 17, wherein the instructions when executed, further cause the machine to enhance a null pointer exception having default null pointer message associated with the null pointer error by associating the extended null pointer message to the default null pointer message within the null pointer exception.

19. The machine-readable storage medium of claim 15, wherein the instructions when executed, further cause the machine to data analyze a code section of the software application associated with an array index out of bounds error to form an extended array index out of bounds message having an analysis of the array index out of bounds error.

20. The machine-readable storage medium of claim 19, wherein the instructions when executed, further cause the machine to enhance an array index out of bounds exception having default array index out of bounds message associated with the array index out of bounds error by associating the extended array index out of bounds message to the default array index out of bounds message within the array index out of bounds exception.

21. The machine-readable storage medium of claim 15, wherein performing data analysis further includes translating the one or more bytecodes into a human-readable text message being included in the extended message.

* * * * *